United States Patent
Gabrielson

(12) United States Patent (10) Patent No.: US 9,225,608 B1
Gabrielson (45) Date of Patent: Dec. 29, 2015

(54) EVALUATING CONFIGURATION CHANGES BASED ON AGGREGATE ACTIVITY LEVEL

(75) Inventor: Jacob Gabrielson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 591 days.

(21) Appl. No.: 13/333,239

(22) Filed: Dec. 21, 2011

(51) Int. Cl.
G06F 15/16 (2006.01)
H04L 12/24 (2006.01)

(52) U.S. Cl.
CPC .................................. *H04L 41/147* (2013.01)

(58) Field of Classification Search
CPC ..................................................... H04L 41/147
See application file for complete search history.

(56) References Cited

U.S. PATENT DOCUMENTS

| | | | | |
|---|---|---|---|---|
| 6,804,714 B1* | 10/2004 | Tummalapalli | | 709/224 |
| 7,024,203 B1* | 4/2006 | Naghian | | 455/453 |
| 7,039,695 B1* | 5/2006 | DeLuca et al. | | 709/223 |
| 7,111,059 B1* | 9/2006 | Garcea et al. | | 709/224 |
| 7,433,943 B1* | 10/2008 | Ford | | 709/223 |
| 8,654,629 B1* | 2/2014 | Craig et al. | | 370/218 |
| 2004/0203820 A1* | 10/2004 | Billhartz | | 455/452.1 |
| 2004/0210654 A1* | 10/2004 | Hrastar | | 709/224 |
| 2007/0115906 A1* | 5/2007 | Gao et al. | | 370/338 |
| 2009/0235268 A1* | 9/2009 | Seidman et al. | | 718/104 |
| 2009/0257357 A1* | 10/2009 | Marsh | | 370/252 |
| 2009/0276771 A1* | 11/2009 | Nickolov et al. | | 717/177 |
| 2010/0064151 A1* | 3/2010 | Saeki | | 713/300 |
| 2011/0078290 A1* | 3/2011 | Calo et al. | | 709/221 |
| 2011/0078318 A1* | 3/2011 | Desai et al. | | 709/228 |
| 2012/0016623 A1* | 1/2012 | Hayner | | 702/141 |

* cited by examiner

*Primary Examiner* — Lance Leonard Barry
*Assistant Examiner* — Keyvan Emdadi
(74) *Attorney, Agent, or Firm* — Thomas|Horstemeyer LLP; Michael J. D'Aurelio; Jason M. Perilla

(57) ABSTRACT

Disclosed are various embodiments for computing and using an aggregate activity level for a computing system. Activity level metrics are obtained from a corresponding plurality of components in a data center. A current aggregate activity level request is received. An aggregate activity level is computed from the activity level metrics. The aggregate activity level is compared to a baseline aggregate activity level. In response to the request, an indication is provided as to whether the aggregate activity level falls within a predefined range of the baseline aggregate activity level.

22 Claims, 5 Drawing Sheets

EVALUATING CONFIGURATION CHANGES BASED ON AGGREGATE ACTIVITY LEVEL

BACKGROUND

A computing system includes hardware, software, and sometimes network components. The configuration of the computing system will change over time, as existing components are upgraded, modified, deleted, or taken offline and as new components are added. Today it is common for enterprise computing systems to include dozens or even hundreds of different components. When a computing system is this large, it is desirable to plan carefully for such configuration changes, since large numbers of users are likely to be affected. Also, configuration changes can have unexpected consequences in a large system, where the number of component interactions grows faster than the number of components.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The various embodiments described herein relate to computing an aggregate activity level for components in a monitored computing system, and using the aggregate activity level to facilitate decisions about changes to the configuration of the monitored system. Before making a change to a component in the monitored system, it would be useful to know that the monitored system is operating in an expected or normal state rather than an unexpected or abnormal state. Components in existing systems do provide monitoring capabilities which allow various aspects of the component's operation to be monitored. For example, a software service may allow the number of transactions received and/or completed to be monitored, or a network device may allow the number of packets transmitted and/or received to be monitored. Such monitoring capabilities may also extend to error reporting. For example, the component may write to an error log when an internal error is detected.

Such data is not useful in determining whether the system is operating as expected because no one person, or even one team, can be expected to understand the meaning, semantics, or implication of the vastly different types of monitoring data that are collected. Instead, the team responsible for developing or maintaining software component A can only reasonably be expected to understand the monitoring data produced by component A, while the team responsible for hardware upgrades can only reasonably be expected to understand the monitoring data produced by hardware component B.

Embodiments disclosed herein focus on the aggregate level of activity in a monitored system rather than the meaning or content of the monitoring data. By first establishing a baseline aggregate activity level for the system as a whole, then taking a snapshot of the current aggregate activity level, a comparison of the current aggregate activity level and the baseline aggregate activity level can be utilized to decide whether implementing a configuration change at the present time is safe or risky. By focusing on the aggregate activity level rather than monitoring data produced by individual components, the embodiments disclosed herein are useful for large systems involving scores, hundreds, or even thousands of software, hardware, and network components. In the following discussion, a general description of the system and its components is provided, followed by a discussion of the operation of the same.

Figure 1:
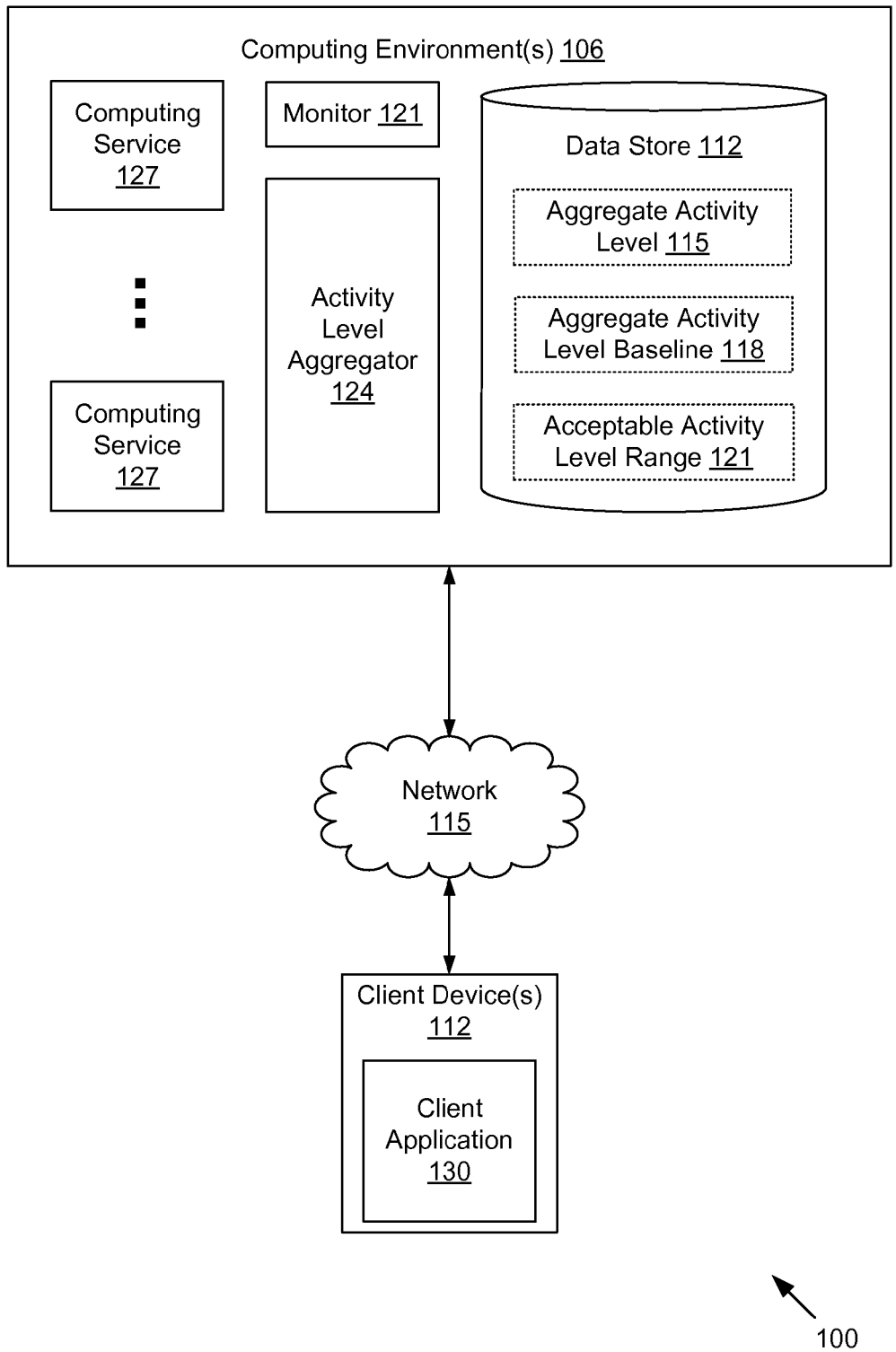
FIG. 1 is a drawing of a networked environment according to one embodiment of the present disclosure.

With reference to FIG. 1, shown is a networked environment 100 according to various embodiments. The networked environment 100 includes a computing environment 103 in data communication with one or more client devices 106 by way of a network 109. The network 109 includes, for example, the Internet, intranets, extranets, wide area networks (WANs), local area networks (LANs), wired networks, wireless networks, or other suitable networks, or any combination of two or more such networks.

The computing environment 103 may comprise, for example, a server computer or any other system providing computing capacity. Alternatively, a plurality of computing devices may be employed that are arranged, for example, in one or more server banks or computer banks or other arrangements. For example, a plurality of computing devices together may comprise a cloud computing resource, a grid computing resource, and/or any other distributed computing arrangement. Such computing devices may be located in a single installation or may be distributed among many different geographical locations.

The computing environment 103 may implement an electronic commerce system that facilitates the online viewing and/or purchase of items and products in an electronic catalog over the network 109. For example, the electronic commerce system may provide content in response to user queries about items in the electronic catalog. To this end, an electronic commerce application (not shown) executing in the computing environment 103 may be executed to fetch network pages in response to user queries about items in the electronic catalog. In some embodiments, the computing environment 103 executes a web server to fetch web pages on behalf of the electronic commerce application. The electronic commerce system also performs various backend functions associated with the online presence of a merchant in order to facilitate the online purchase of items as should be appreciated.

The computing environment 103 may be operated by a hosting provider to host network sites for various customers, or may be controlled and managed by a provider entity that provides access to resources of the computing environment 103 to customers for a fee under a utility computing model. Such a system is sometimes referred to as "cloud computing system," but the term "cloud computing" is not intended to be limiting. The computing environment 103 may utilize differing hardware platforms and may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. The computing environment 103 may be executing instances of virtual machines used to provide general computing capability to customers. Customers may be capable of terminating machine instances or launching machine instances whenever they desire, thereby providing an elastic computing resource.

Various applications and/or other functionality may be executed in the computing environment 103 according to various embodiments. Also, various data may be stored in a data store 112 that is accessible to the computing environment 103. The data stored in the data store 112, for example, is associated with the operation of the various applications and/or functional entities of the computing environment 103 as described herein. The data stored in the data store 112 includes, for example, an aggregate activity level 115, an aggregate activity level baseline 118, an acceptable activity level range 121, and potentially other data.

The components executed on the computing environment 103 may include, for example, an activity level aggregator 124 and one or more computing services 127. Each of the computing services 127 exports one or more functions through a programmatic interface. A computing service 127 may be implemented, for example, as a web service. Various computing services 127 may, in combination, implement a cloud computing system or an electronic commerce application as described above. Some of the computing services 127 may also communicate with a monitor 121 which collects metric(s) from one or more computing services 127. The computing environment 103 may also execute other applications, services, processes, systems, engines, or functionality not discussed in detail herein.

The activity level aggregator 124 is executed to obtain individual activity level metrics from various monitors 121 and to aggregate the metrics into an aggregate activity level 115 for a particular system. In some embodiments, the granularity of aggregation may be a data center. That is, the aggregate activity level 115 is representative of the activity of all monitored components in a particular data center. The monitored components may include software services, hardware computing devices, network devices (not shown), etc.

As mentioned above, the aggregate activity level at a particular point in time can be compared to an aggregate activity level baseline 118 to determine whether the monitored system is operating under normal or abnormal conditions. Since it may be undesirable to change the system configuration when the system is experiencing abnormal conditions, the activity level aggregator 124 may also use the aggregate activity level to indicate whether or not a proposed change to the configuration of the monitored system is recommended.

The client device 106 is representative of a plurality of client devices that may be coupled to the network 109. The client device 106 may comprise, for example, a processor-based system such as a computer system. Such a computer system may be embodied in the form of a desktop computer, a laptop computer, a personal digital assistant, a cellular telephone, a smart phone, a set-top box, a television, a music player, a video player, a media player, a web pad, a tablet computer system, a game console, an electronic book reader, or other devices with like capability. The client device 106 may be configured to execute various applications such as a client application 130. The client device 106 may be configured to execute applications beyond the client application 130 such as, for example, email applications, messaging applications, and/or other applications.

The client application 130 may be executed in the client device 106, for example, to request from the activity level aggregator 124 the current aggregate activity level 115 of a monitored system. The client application 130 may then display the aggregate activity level 115 to a user. The display may include a further indication of the aggregate activity level baseline 118 and the acceptable activity level range 121 so that the user can visually determine whether the current aggregate activity level 115 falls within the acceptable range surrounding the baseline. The client application 130 may also be executed to query the activity level aggregator 124 as to whether a configuration change to a monitored system is recommended at the current time, given the current aggregate activity level 115.

Figure 2:
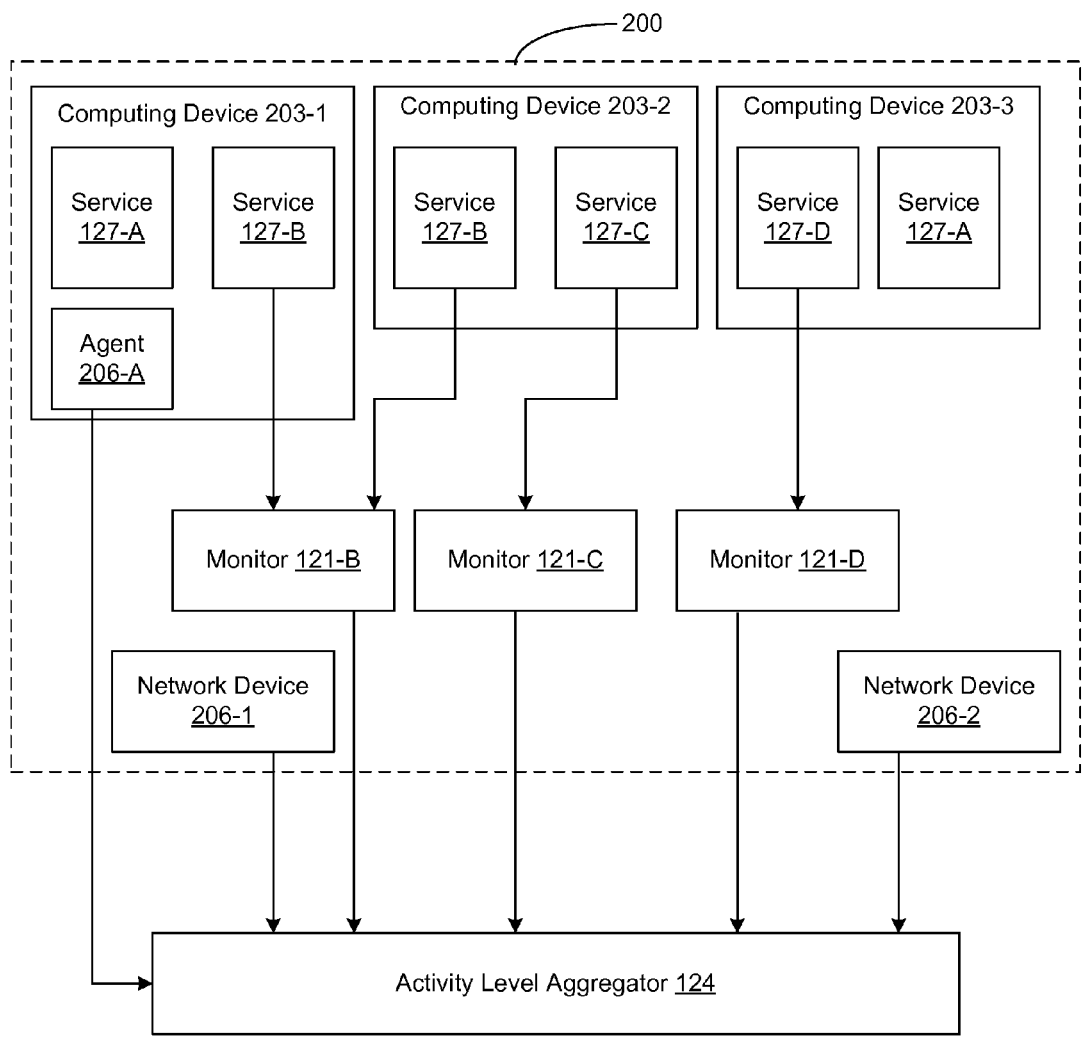
FIG. 2 is a drawing showing another view of the networked environment of FIG. 1 according to an example embodiment of the present disclosure.

Moving on to FIG. 2, shown is another view of the networked environment 100 (FIG. 1) according to an example embodiment disclosed herein. The discussion of FIG. 1 introduced an activity level aggregator 124 which computed an aggregate activity level for a monitored set of components. Where FIG. 1 presented a logical view of the system without regard to physical location, FIG. 2 focuses on activity level monitoring of a portion of the computing environment 103 that corresponds to a single data center. As used herein, a data center refers to the set of computing equipment residing in a small geographic area such as a floor of a single building, a single building, a set of buildings on a campus, etc. Data centers may be organized into geographic zones.

In the example configuration shown in FIG. 2, the data center 200 includes three computing units 203-1, 203-2, and 203-3, which together execute four different computing services 127. Specifically the computing unit 203-1 executes a first instance of a computing service 127-A and a first instance of another computing service 127-B, the computing unit 203-2 executes a first instance of yet another computing service 127-C and a second instance of the computing service 127-B, and the computing unit 203-3 executes a first instance of still another computing service 127-D and a second instance of the computing service 127-A.

The data center 200 also includes two network devices 206-1 and 206-2, a data storage system, and a power distribution system (not shown). The network devices 206 may take the form of, for example, a switch, a router, a gateway, or any other device which transfers packets through the data center 200. The data center 200 may also include many other components not illustrated, such as cooling equipment and redundancy switching equipment, as should be appreciated.

The data center 200 communicates (through the network 109, not shown) with the activity level aggregator 124. As can be seen in FIG. 2, the activity level aggregator 124 receives multiple activity level metrics from different monitored components. Some of the activity level metrics are first collected by a monitor 121, and then retrieved by the activity level aggregator 124. For example, the monitor 121-B monitors logging and/or error output from all instances of computing service 127-B executing in the data center 200, then the activity level aggregator 124 obtains instance-aggregated activity level metrics for the computing service 127-B from the monitor 121-B. Similarly, the activity level aggregator 124 obtains instance-aggregated activity level metrics for computing service 127-C from the monitor 121-C, and the activity level aggregator 124 obtains instance-aggregated activity level metrics for computing service 127-D from the monitor 121-D. The monitors 121 may track, for example, the number of service requests received by a computing service 118, a number of service requests completed by a computing service 118, and a number of pages served by a computing service 118.

For other activity level metrics, the activity level aggregator 124 acts as a first level collector. For example, since no monitor is present in the data center 200 for the computing service 127-A, an activity level agent 206-A periodically collects activity level metrics from each instance of the computing service 127-A and provides these metrics to the activity level aggregator 124. The activity level aggregator 124 also receives activity level metrics from the network devices 206. The metrics provided by a network device 206 may, for example, include the number of packets transmitted, the number of packets received, the number of packets dropped, the number of packets retransmitted, the number of Simple Network Management Protocol (SNMP) traps generated, and other metrics. The activity level aggregator 124 may also receive activity level metrics which apply to a particular computing device as a whole, for example, processor load, memory usage, page file usage, and other metrics.

Over time, the data center 200 can be expected to undergo changes to its configuration which can greatly impact customers using systems hosted by the data center 200. Some of these configuration changes may be expected. For example, the hardware of a computing unit 203 in the data center 200 may undergo planned upgrades or routine maintenance. Similarly, the network devices 206, the power distribution system, and the data storage system may undergo planned upgrades or routine maintenance. Some software configuration changes are expected, for example, planned version changes to software executing on a computing unit 203, and installation of new software executing on a computing unit 203. Some configuration changes may be unexpected, such as replacement of equipment due to errors and software reinstallation due to errors.

The activity level aggregator 124 facilitates a decision about when to make a change to the configuration of a monitored system. More specifically, a configuration change is probably undesirable when the aggregate activity level 115 is outside of a predefined acceptable activity level range 121 of the aggregate activity level baseline 118. To this end, before making a change to the configuration of the data center 200, the activity level aggregator 124 is queried to determine whether the aggregate activity level 115 is within the predefined acceptable activity level range 121 of the aggregate activity level baseline 118. In some embodiments, the activity level aggregator 124 is integrated with the overall automated configuration process, so that either a denial of a configuration change request or an indication from the activity level aggregator 124 that the aggregated level is out of range will prevent the configuration change from taking place. In other embodiments in which the configuration change process is partly automated, a query of the activity level aggregator 124 occurs automatically, but a user is expected to abort the configuration change process if the activity level aggregator 124 returns a negative indication.

Next, a general description of the operation of the various components of the networked environment 100 is provided. To begin, the activity level aggregator 124 establishes an aggregate activity level baseline 118 by observing behavior of the monitored system over an extended period of time, such as a day, a week, or several weeks. Activity level metrics are obtained and periodically aggregated, producing a series of aggregate activity levels 115. From this series, an aggregate activity level baseline 118 for normal or expected system behavior is derived. The series may be processed, for example, to exclude statistical outliers or to exclude time periods during which abnormal behavior is known to be present. The aggregate activity level baseline 118 may be updated periodically by including recently computed aggregate activity levels 115 and/or excluding previously computed aggregate activity levels 115.

An aggregate activity level 115 within a predefined acceptable activity level range 121 of this aggregate activity level baseline 118 is considered normal, while an aggregate activity level 115 outside of the predefined acceptable activity level range 121 is considered abnormal. In some embodiments, the use of a particular aggregate activity level 115 to update the baseline 118 is conditional upon the aggregate activity level 115 being within the normal range. In this manner, anomalous readings do not become part of the baseline 118. As noted above, it is desirable to limit changes to the configuration of the monitored system to periods of normal system behavior, and to avoid configuration changes during periods of abnormal system behavior. To this end, an aggregate activity level 115 computed by the activity level aggregator 124 is used in deciding whether or not a configuration change can be made with confidence.

Once the aggregate activity level baseline 118 has been established, the activity level aggregator 124 continues to receive activity level metrics from various components in a monitored system. The activity level aggregator 124 may maintain a history of previously received individual activity level metrics. Alternatively, the activity level aggregator 124 may store only the last activity metric received from each monitored component and compute an aggregate activity level 115 representing the most recent set of metrics.

The activity level aggregator 124 may then receive a query related to aggregate activity level 115 from a client application 130. One example is a request for the aggregate activity level 115 of a monitored system, in which case the activity level aggregator 124 returns the most recent aggregate activity level 115. Another example is a query as to whether the most recent aggregate activity level 115 for a monitored system lies within the predefined acceptable activity level range 121 of the aggregate activity level baseline 118, in which case the activity level aggregator 124 compares the most recent aggregate activity level 115 to the predefined acceptable activity level range 121 surrounding the aggregate activity level baseline 118, and returns a positive or negative indication. Yet another example is a query as to whether a configuration change to the monitored system is recommended based on the most recent aggregate activity level baseline 118. In the case of a configuration change request, the activity level aggregator 124 compares the most recent aggregate activity level 115 to the predefined acceptable activity level range 121 surrounding the aggregate activity level baseline 118, then grants the request if the aggregate activity level 115 is within the predefined range or denies the request if not.

Figure 3:
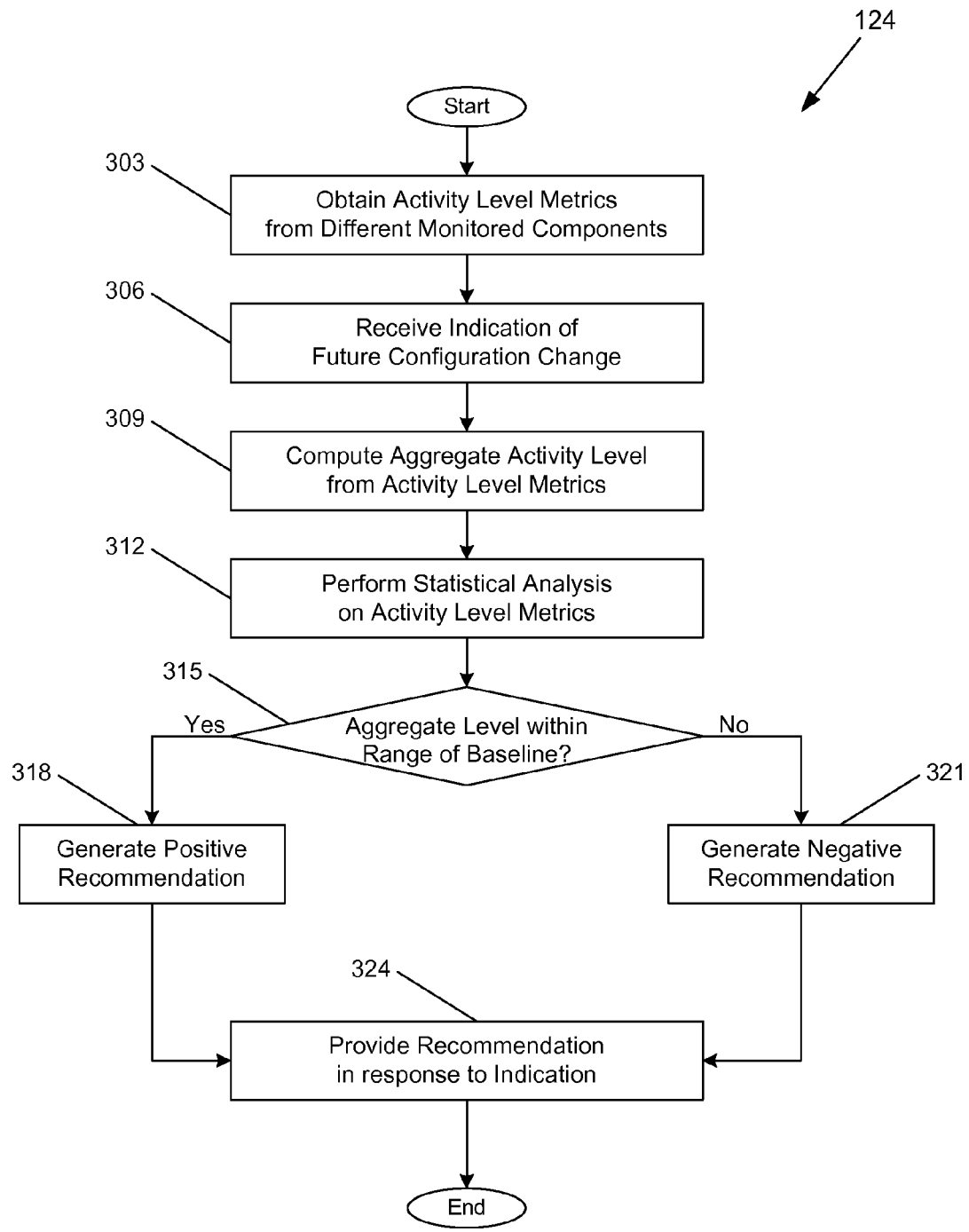
FIG. 3 is a flowchart illustrating an example of functionality implemented as portions of an activity level aggregator application executed in a computing device in the networked environment of FIG. 1 according to various embodiments of the present disclosure.

With reference now to FIG. 3, shown is a flowchart that provides one example of the operation of portion(s) of the activity level aggregator 124 according to various embodiments. It is understood that the flowchart of FIG. 3 provides merely an example of the many different types of functional arrangements that may be employed to implement the operation of portion(s) of the activity level aggregator 124 as described herein. As an alternative, the flowchart of FIG. 3 may be viewed as depicting an example of steps of a method implemented in the computing environment 103 (FIG. 1) according to one or more embodiments.

Beginning at box 303, the activity level aggregator 124 obtains activity level metrics from different monitored components. The activity level aggregator 124 may periodically retrieve these metrics and maintain a buffer of recently received individual activity level metrics. The size of the buffer and/or number of stored metrics may be based on a time period, for example, the activity level aggregator 124 may keep the last N minutes of individual activity level metrics.

Next, at box 306, the activity level aggregator 124 receives an indication that a configuration change to the monitored system is contemplated. The indication may directly specify the system to which the change applies, or this information may be derived, for example, from the entry point used by the requester. At box 309, the activity level aggregator 124 computes the aggregate activity level 115 for the monitored system. This computation will be discussed in further detail in connection with FIG. 4 but it should be noted that in some embodiments the aggregate activity level 115 is pre-computed as sets of individual metrics are received while in other embodiments, the aggregate activity level 115 is computed from the most recent individual metrics, at the time of the request.

In some embodiments, the activity level aggregator 124 computes, at the time of the indication at box 306, the aggregate activity level 115 for the last time period of a specified duration. For example, if the time period is five minutes and if the indication is received at 1:07 PM, the activity level aggregator 124 performs the computation using metrics for the period from 1:02 PM to 1:07 PM. In other embodiments, the activity level aggregator 124 computes the aggregate for the last time period for which a full set of collected metrics from all monitored components is available. For example, if the request is received at 1:07 PM but the last full set of individual metrics was collected at 1:05 PM, the activity level aggregator 124 may compute the aggregate using the metrics from 1:05 PM, even though some other individual metrics may have since been obtained between 1:05 PM and 1:07 PM. Thus, in such embodiments, the activity level aggregator 124 may maintain a most recent aggregate activity level 115 (e.g., for 1:00 PM, for 1:05 PM, for 1:10 PM) and provide the pre-computed value upon receipt of a request from a client application 130.

At box 312, the activity level aggregator 124 performs statistical analysis on the collected activity level metrics and/or on the baseline activity level. The activity level aggregator 124 may, for example, perform a stochastic gradient descent algorithm. The activity level aggregator 124 may accumulate a series of activity level metrics over time and produce various statistical summaries of the time series, such as moving averages, percentiles, and so on.

Next, at box 315, the activity level aggregator 124 examines the aggregate activity level 115 computed at box 309 and determines whether the aggregate activity level 115 is within a predefined range of the previously determined aggregate activity level baseline 118. For example, if the aggregate activity level baseline 118 is 50 and predefined range is +/−10, then aggregate activity level 115 between 40 and 60 lies within the predefined range of the aggregate activity level baseline 118. The determination at box 315 may involve a straight comparison of the computed aggregate activity level 115 and the aggregate activity level baseline 118. Alternatively, the determination may involve filtering metrics by time, for example, comparing the baseline 118 to the last five minutes of collected metrics, where the metrics are further partitioned into one minute intervals.

If at box 315 it is determined that the aggregate activity level 115 is within a predefined range of the aggregate activity level baseline 118, then processing continues at box 318, where the activity level aggregator 124 generates a positive recommendation for the indicated configuration change. If it is instead determined that the aggregate activity level 115 is outside of the predefined range, then processing continues at box 321, where the activity level aggregator 124 generates a negative recommendation for the indicated configuration change. In either case, processing continues at box 324, where the activity level aggregator 124 provides the generated recommendation (positive or negative) to the requester. The process of FIG. 3 is then complete.

As described herein, a negative recommendation means that the configuration change should not be implemented because the aggregate activity level 115 shows that the monitored system is in an unexpected or abnormal state and further changes to the configuration could exacerbate the condition. Similarly, a positive recommendation means that it is safe to implement the configuration change because the aggregate activity level 115 shows that the monitored system is in an expected or normal state.

While the embodiment described in connection with FIG. 3 utilizes the aggregate activity level 115 to handle indications of a contemplated configuration change, other embodiments of the activity level aggregator 124 utilize the aggregate activity level 115 in other ways. For example, some embodiments provide the aggregate activity level 115 in response to an explicit client request for the level. Other embodiments provide the aggregate activity level 115, the aggregate activity level baseline 118, and the predefined range.

As may be appreciated, the functionality performed in the various boxes of FIG. 3 may be performed in a different order than illustrated. For example, the aggregate activity level metric may be computed before or after the indication of future configuration change is received. Furthermore, the functionality performed in the various boxes of FIG. 3 may be performed periodically. For example, activity level metrics may be obtained on a periodic basis, the baseline activity level may be determined on a periodic basis, a check for an indication of future configuration change may be performed periodically, and so on. Furthermore, the process of FIG. 3 may be polled, event driven, or some combination thereof, as may be appreciated.

Figure 4:
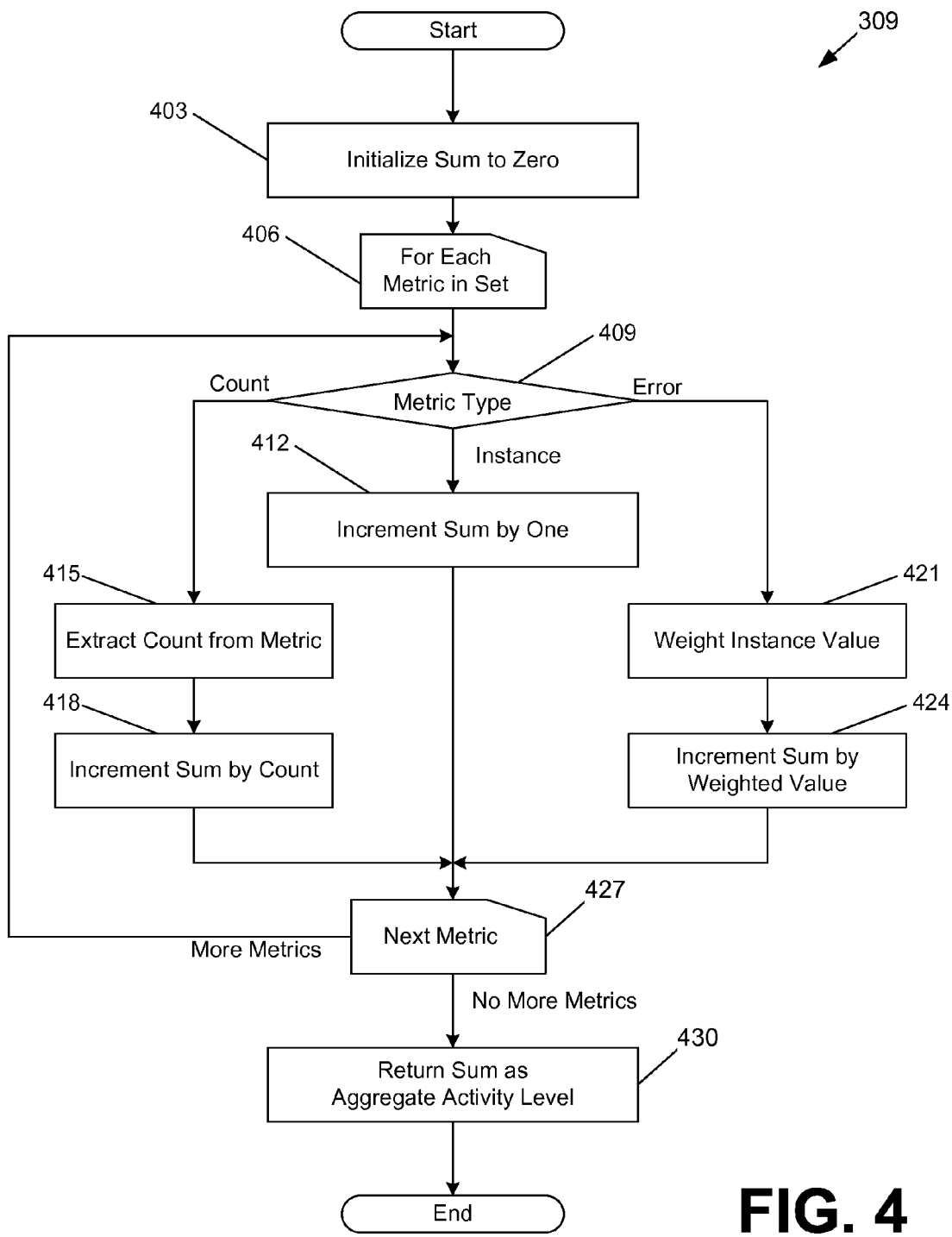
FIG. 4 is a flowchart illustrating an example of functionality implemented as portions of an activity level aggregator application executed in a computing device in the networked environment of FIG. 1 according to various embodiments of the present disclosure.

Turning now to FIG. 4, shown is a flowchart that another example of the operation of portion(s) of the activity level aggregator 124 according to various embodiments. Specifically, the flowchart of FIG. 4 provides further details of the operation of box 309 from FIG. 3. It is understood that the flowchart of FIG. 4 provides merely an example of the many different types of functional arrangements that may be employed to implement the operation of portion(s) of the activity level aggregator 124 as described herein. As an alternative, the flowchart of FIG. 4 may be viewed as depicting an example of steps of a method implemented in the computing environment 103 (FIG. 1) according to one or more embodiments.

Beginning at box 403, the activity level aggregator 124 sets the current aggregate activity level 115 to zero. Next, at box 406, the activity level aggregator 124 begins a loop which iterates through the set of individual metrics on which the computation is based (where the process of choosing the set of metrics was explained earlier in connection with FIG. 3). The iteration begins with a first individual metric, but no particular order is implied.

At box 409, the activity level aggregator 124 determines the type of the current individual metric. If the current individual metric is an instance metric, then processing continues at box 412 where the aggregate activity level 115 increments the aggregate activity level 115 by one. If instead it is determined at box 409 that the current individual metric is a count metric, then processing continues at box 415 where the activity level aggregator 124 extracts the count from the stored metric data, then to box 418 where the aggregate activity level 115 is incremented by the count. Thus, an instance metric increases the aggregate by one but a count metric increases the aggregate by an amount stored in the metric itself.

If at box 409 it is determined that the current individual metric is an error metric, then processing continues at box 421 where the activity level aggregator 124 applies a weighting factor to the value of an instance metric. Next, at box 424 the aggregate activity level 115 is incremented by the weighted value. For example, if an instance metric is counted as one, and the error weighting factor is five, then box 418 would increase the aggregate activity level 115 by five.

Next, at box 427, the activity level aggregator 124 moves to the next individual metric in the set and repeats the iteration loop starting at box 406. When all metrics have been processed, processing continues at box 430, where the computed sum is returned as the aggregate activity level 115. The process of FIG. 4 is complete.

Figure 5:
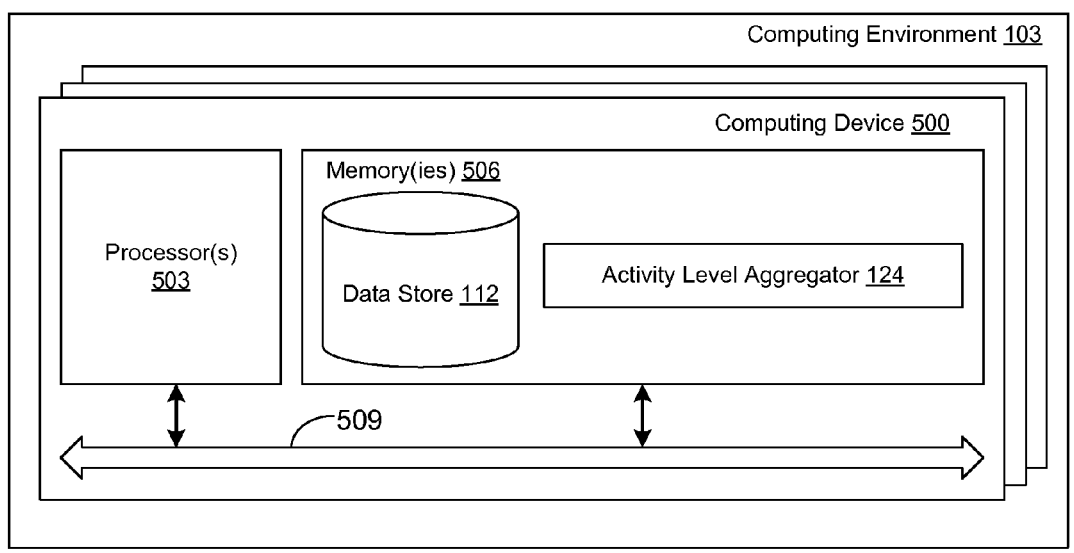
FIG. 5 is a schematic block diagram that provides one example illustration of a computing device employed in the networked environment of FIG. 1 according to various embodiments of the present disclosure.

Moving on to FIG. 5, shown is a schematic block diagram of a computing device 500 according to an embodiment of the present disclosure. The computing device 500 corresponds to a representative computing device which may be employed in the computing environment 103 (FIG. 1). The computing device 500 includes at least one processor circuit, for example, having a processor 503 and a memory 506, both of which are coupled to a local interface 509. To this end, the computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the activity level aggregator 124 and potentially other applications. In addition, an operating system may be stored in the processor 503 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and executed by the processor 503, source code that may be expressed in proper format such as object code that is capable of being loaded into a random access portion of the memory 506 and executed by the processor 503, or source code that may be interpreted by another executable program to generate instructions in a random access portion of the memory 506 and executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors and the memory 506 may represent multiple memories that operate in parallel processing circuits, respectively. In such a case, the local interface 509 may be an appropriate network 109 (FIG. 1) that facilitates communication between any two of the multiple processors 503, between any of the processors 503 and any of the memories 506, or between any two of the memories 506, etc. The local interface 509 may comprise additional systems designed to coordinate this communication, including, for example, performing load balancing. The processor 503 may be of electrical or of some other available construction.

Although the activity level aggregator 124 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the activity level aggregator 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as one of the processors 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in the flowcharts of FIGS. 3 and 4 may be executed concurrently or with partial concurrence. Further, in some embodiments, one or more of the blocks shown in the flowcharts of FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein (including the activity level aggregator 124) that comprises software or code can be embodied in any non-transitory computer-readable medium for use by or in connection with an instruction execution system such as, for example, the processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that obtains a first plurality of activity level metrics from a plurality of components in a data center;
    code that computes a baseline aggregate activity level for the data center from the first plurality of activity level metrics;
    code that obtains a second plurality of activity level metrics from the plurality of components in a data center;
    code that receives a change request for a change in configuration to the data center;
    code that computes a most recent aggregate activity level for the data center by summing a number of instances of the second plurality of activity level metrics;
    code that grants the change request when the most recent aggregate activity level for the data center falls within a predefined range of the baseline aggregate activity level for the data center; and
    code that denies the change request when the most recent aggregate activity level for the data center falls outside of the predefined range of the baseline aggregate activity level for the data center.

2. The non-transitory computer-readable medium of claim 1, wherein the plurality of components includes at least one of a network device residing in the data center, at least one server device residing in the data center, or at least a portion of a web service that executes on the at least one server device, and the first plurality of activity level metrics are associated with at least one of a number of service requests received, a number of service requests completed, or a number of pages served by the plurality of components in the data center.

3. The non-transitory computer-readable medium of claim 1, the program further comprising:
    code that extracts a count metric from each of the second plurality of activity level metrics that represents a count;
    code that adds each of the count metrics to the summed number of instances;
    code that applies a weighting factor to each of the second plurality of activity level metrics that represents an error; and
    code that adds each of the weighted activity level metrics to the summed number of instances.

4. A method, comprising:
    obtaining, by a computing device, a plurality of activity level metrics from a plurality of components in at least one data center;
    receiving, by the computing device, a current aggregate activity level request;
    computing, by the computing device, an aggregate activity level from the plurality of activity level metrics;
    determining, by the computing device, whether the aggregate activity level is within a predefined range of a baseline aggregate activity level; and
    in response to the current aggregate activity level request, providing, by the computing device, an indication of whether the aggregate activity level falls within the predefined range of the baseline aggregate activity level.

5. The method of claim 4, wherein the plurality of components includes at least a portion of a web service that executes on at least one server device residing in the at least one data center.

6. The method of claim 5, wherein an activity level metric obtained from the web service comprises at least one of a number of service requests received by the web service, a number of service requests completed by the web service, or a number of pages served by the web service.

7. The method of claim 4, wherein the plurality of components includes a network device residing in the at least one data center.

8. The method of claim 7, wherein an activity level metric obtained from the network device comprises at least one of a number of packets transmitted by the network device, a number of packets received by the network device, or a number of simple network management protocol (SNMP) traps reported by the network device.

9. The method of claim 4, wherein the plurality of components includes a server computing device residing in the at least one data center.

10. The method of claim 9, wherein an activity level metric obtained from the server computing device comprises at least one of a processor load, a memory usage, or a page file usage.

11. The method of claim 4, the computing further comprising summing a number of instances of the plurality of activity level metrics to produce the aggregated activity level.

12. The method of claim 11, the computing further comprising:
    extracting a count metric from each of the plurality of activity level metrics that represents a count; and
    adding each of the count metrics to the summed number of instances.

13. The method of claim 11, the computing further comprising:
    applying a weighting factor to each of the plurality of activity level metrics that represents an error; and
    adding each of the weighted activity level metrics to the summed number of instances.

14. The method of claim 4, further comprising performing statistical analysis on a time series of computed aggregate activity levels.

15. A system, comprising:
    at least one computing device; and
    an application implemented in the at least one computing device, the application being configured to:
        obtain a plurality of activity level metrics from a plurality of components in a data center;
        compute an aggregate activity level for the data center from the plurality of activity level metrics;
        receive a recommendation request for a change in configuration to the data center;
        provide a positive recommendation in response to the recommendation request when the aggregate activity level for the data center falls within a predefined range of a baseline aggregate activity level for the data center; and
        provide a negative recommendation in response to the recommendation request when the aggregate activity level for the data center falls outside of the predefined range of the baseline aggregate activity level for the data center.

16. The system of claim 15, wherein the plurality of components includes at least one of a network device residing in the data center, at least one server device residing in the data center, or at least a portion of a web service that executes on the at least one server device.

17. The system of claim 15, the application further configured to sum a number of instances of the plurality of activity level metrics to produce the aggregated activity level.

18. The system of claim 17, the application further configured to:
    extract a count metric from each of the plurality of activity level metrics that represents a count; and
    add each of the count metrics to the summed number of instances.

19. The system of claim 17, the application further configured to:
    apply a weighting factor to each of the plurality of activity level metrics that represents an error; and
    add each of the weighted activity level metrics to the summed number of instances.

20. The system of claim 15, the application further configured to:
    maintain a most recent set of activity level metrics; and
    compute the aggregate activity level for the data center based on the most recent set of activity level metrics.

21. The system of claim 15, the application further configured to update the baseline aggregate activity level from the aggregate activity level.

22. The system of claim 21, wherein the update is conditional upon the aggregate activity level falling within a predefined range of the baseline aggregate activity level.

* * * * *